(12) United States Patent
Maslovskis

(10) Patent No.: US 9,286,412 B2
(45) Date of Patent: Mar. 15, 2016

(54) SEARCH RESULTS WITH UNIFORMLY DISTRIBUTED CATEGORIES

(71) Applicant: Romualdas Maslovskis, Los Gatos, CA (US)

(72) Inventor: Romualdas Maslovskis, Los Gatos, CA (US)

(73) Assignee: X. Commerce, Inc., Campbell, CA (US)

(*) Notice: Subject to any disclaimer, the term of this patent is extended or adjusted under 35 U.S.C. 154(b) by 221 days.

(21) Appl. No.: 13/841,017

(22) Filed: Mar. 15, 2013

(65) Prior Publication Data

US 2013/0268515 A1    Oct. 10, 2013

Related U.S. Application Data

(60) Provisional application No. 61/622,377, filed on Apr. 10, 2012.

(51) Int. Cl.
*G06F 17/30* (2006.01)

(52) U.S. Cl.
CPC ............ *G06F 17/30991* (2013.01)

(58) Field of Classification Search
None
See application file for complete search history.

(56) References Cited

U.S. PATENT DOCUMENTS

| | | | |
|---|---|---|---|
| 2006/0224406 A1* | 10/2006 | Leon et al. | 705/1 |
| 2007/0156446 A1* | 7/2007 | Jolly et al. | 705/1 |
| 2009/0271275 A1* | 10/2009 | Regmi et al. | 705/14.73 |
| 2012/0004973 A1* | 1/2012 | Postrel | 705/14.27 |
| 2012/0150611 A1* | 6/2012 | Isaacson et al. | 705/14.27 |
| 2012/0191577 A1* | 7/2012 | Gonsalves et al. | 705/27.2 |
| 2012/0233631 A1* | 9/2012 | Geshwind | 725/1 |

* cited by examiner

*Primary Examiner* — Wilson Lee
(74) *Attorney, Agent, or Firm* — Schwegman Lundberg & Woesser, P.A.

(57) ABSTRACT

A service provider presents results from a search query with dynamic category ranges, with each category range having approximately the same number of items within the category range.

21 Claims, 3 Drawing Sheets

SEARCH RESULTS WITH UNIFORMLY DISTRIBUTED CATEGORIES

CROSS REFERENCE TO RELATED APPLICATION

This application claims priority to U.S. Provisional Patent App. Ser. No. 61/622,377, filed Apr. 10, 2012, which is incorporated by reference in its entirety.

BACKGROUND

1. Field of the Invention

The present invention generally relates to online search results.

2. Related Art

When a user or consumer wants to find something on the Internet, such as for a possible purchase of goods or services or just to find information, a search is typically conducted. The user enters one or more desired search terms that relate to the information sought by the user. The more terms and/or narrower the terms, the more focused the search results may be. When the search terms are submitted, a search engine or Internet Service Provider (ISP) performs the search and returns search results to the user.

Typically, search results are presented on a page with links the user can select to take the user to a particular site for more details. Such results may be presented in order of perceived relevance of the search terms, as determined by the search engine. For online shopping or purchases, specific merchants may have their sites or links listed earlier or featured in the search, e.g., as a paid service to the search engine or ISP. Another way to present search results for shopping is to show the user the search results within different categories or ranges to give the user a more manageable or informative result display. For example, a search for a product may show the user results within different price ranges. This may help the user identify which results would be relevant to the user.

Figure 1:
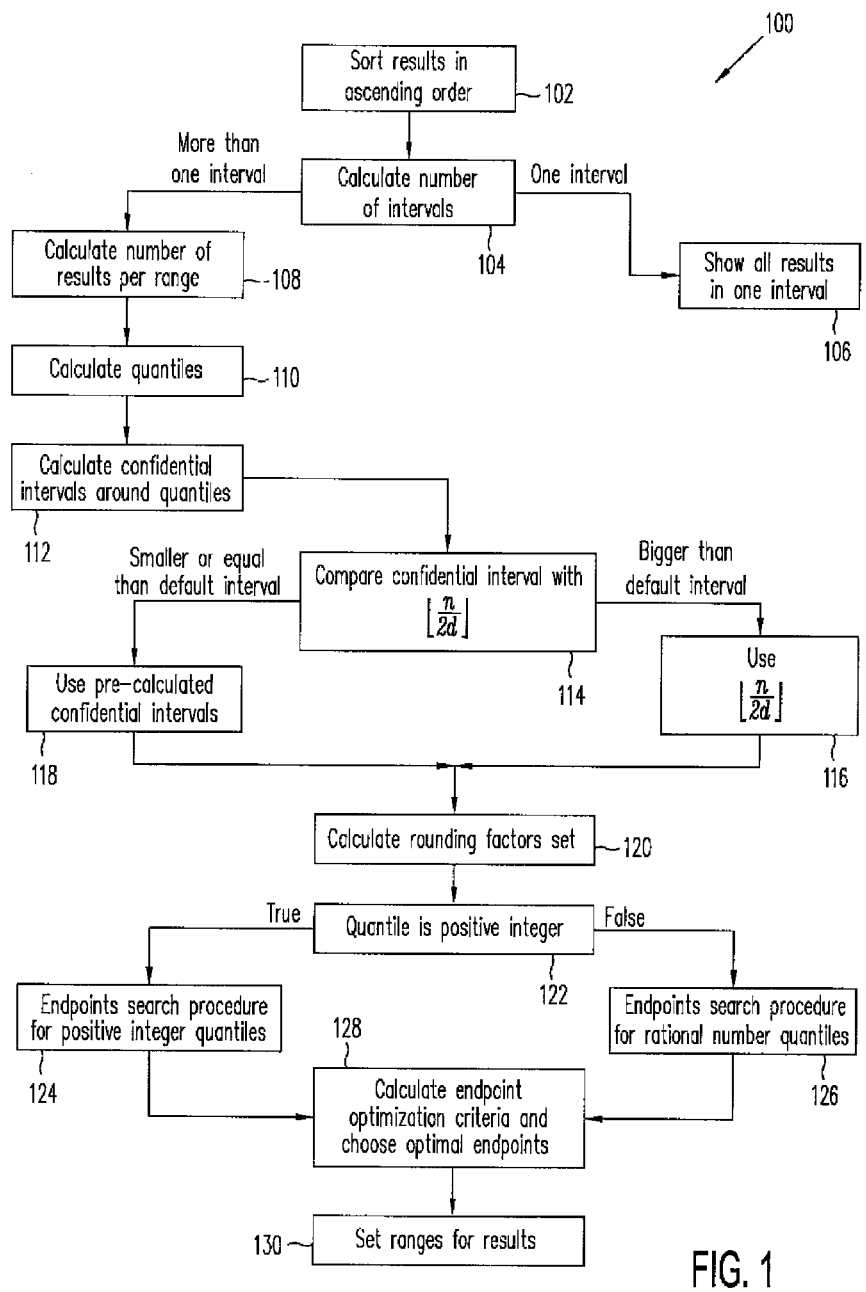
FIG. 1 is a flowchart showing a process for setting ranges for presenting search results according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to one embodiment, a service provider presents results from a search query with dynamic category ranges, with each category range having approximately the same number of items within the category range. In one embodiment, approximately the same is within 10%. In other embodiments, approximately the same is within 5%. The number may vary depending on the number of results and/or merchant specifications.

When a user submits a search query, the system or service provider determines the number of results returned for the query. The system then sets a number of ranges so that between ranges, in one embodiment, all have approximately the same number of results. Number of ranges could be limited by some predefined number. The ranges can be price, merchant rating (quantitative data), merchant sales of the item, category of item, overall, or other quantitative data. The system may determine a rounding factors set for each range. If a range has a large number of items, the user can select that range and see a finer set of ranges within that range. This can continue as needed or desired. Stores, merchants, or other online commerce sites may choose ranges to best suit their needs.

As a result, consumers may be able to better and more easily navigate search results because ranges will not have too many results (making it harder for the user to navigate through the results) or too few results (making it inefficient for the user to navigate through the results).

In one embodiment, a service provider receives a search query from a user through a user device, such as a PC, computing tablet, smart phone, etc. The search query may be for a specific merchant or a group of merchants. The search query may be one or more key words, along with any other search limiters, such as price, etc. For example, the user may enter "blue shirt."

The service provider or system accesses a database, cloud, or memory containing available or offered items/services from the merchant(s) and searches based on the user query. In the above example, the system searches for "blue shirt" and finds 98 items or results matching the search query.

In a typical process, the system may return the results within fixed ranges. For example, the fixed ranges may be price ranges of $0 to $9.99, $10.00 to $19.99, $20.00 to $29.99, $30.00 to $39.99, $40.00 to $49.99, and $50.00 on up. The results may show 0 items in the first four price ranges, 10 items in the next price range, and 88 items in the last price range. This may not be that useful to the consumer, as the consumer would need to select the last price range to see most of the results, which may make it difficult for the user to efficiently navigate through those results.

In one embodiment, the system determines suitable price ranges, such that an approximate same number of items are within each price range. In this example, the price ranges may be $40.00 to $49.99, $50.00 to $54.99, $55.00 to $57.99, $58.00 to $59.99, $60.00 to $69.99, $70.00 to $74.99, $75.00 to $82.99, $83.00 to $85.49, $85.50 to $89.99, and $90.00 to $100.00, with each range having between 8 and 10 items.

The attached flowchart illustrates steps a service provider may perform in determining and/or setting ranges, according to one embodiment.

Thus, the user is presented with a more manageable set of results for navigation.

If the initial search results yielded a very large number of items, the system may still limit the total number of ranges to ten or some other number. In such a case, each range may still have a large number of items, say approximately 200. The user can select a desired range and have the system automatically create ten (or some other number) ranges again containing approximately the same number of items. In this example, each range may contain approximately 20 items. The system may continue to dynamically set ranges within each preceding range as suitable.

In another embodiment, instead of the system determining a suitable range or a number of ranges, the merchant may specify the number. This number may be the initial range or number, such that subsequent ranges are determined by the system for the approximately equal distribution of search results.

Note that although price ranges are described above, other ranges or categories may also be suitable, such as merchant rating (quantitative data), merchant sales of the item, category of item, overall, consumer reviews (e.g., stars), or other quantitative data.

FIG. 1 is a flowchart 100 for a process of setting ranges for search results, according to one embodiment and will be described in conjunction with the description below.

The following algorithm illustrates one embodiment for determining intervals.

1) The system receives a search request from a user or consumer, such as through a user device like a PC, smart phone, computing tablet, or the like. The search request may be accessed through an app or URL. The user may enter desired term(s) to describe what the user is searching for. The search may be for items, services, specific information about a topic, a question, etc. The system may be a service provider that provides search results to a user. After receiving the search request, the system performs the search, as is well known in the art of search engines, and arranges search results in ascending order, at step 102

2) The system calculates a number of intervals, at step 104, using the following formula:

$$d = \text{round}\left(\frac{\max(\text{results}) - \min(\text{results})}{h}\right)$$

where max(results) and min(results) are the minimum and maximum data values, h is the interval width. Interval width h could be found using any well-known formula for calculation histogram bin width (for instance Scott's choice, Freedman-Diaconis' choice, etc.). In one embodiment, if d is bigger than predefined number of ranges (intervals), the system sets d equal to that number. The maximum number may be a number chosen by the system or the merchant in different embodiments. If max(results) and min(results) are equal, the system sets d equal 1 for only one interval. In that case, all the results are shown or presented to the user within one interval, at step 106.

3) If there is more than one interval (d greater than one), the system calculates a percentage of results per range, at step 108, using the following equation:

$$\frac{100\%}{d} = k\ \%$$

4) The system calculates quantiles, at step 110, and calculates confidential intervals around quantiles (or quantile confidential intervals), at step 112, as follows:
  a) The system finds $P_c$. For c=1 to d−1, $$p_c = \frac{c}{d}$$

is calculated;
  b) The system finds quantiles $k_{P_c}$. For c=1 to d−1, $k_{P_c} = P_c * n$ is calculated, where n is the number of results.
  c) The system calculates confidential intervals around quantiles, within which intervals' end points will be searching. Order statistics quantiles are distributed by binominal distributions with parameters n and $P_c$. The system uses normal distribution approximation of binominal distribution with parameters $N(np_c, np_c(1-P_c))$. The system finds confidence intervals, with confidence level 1−α, for $k_{P_c}$, i.e. it finds $r_1^c$ and $r_2^c$ $1 \leq r_1^c < r_2^c \leq n$, such as probability what interval $(r_1^c, r_2^c)$ contain quantile $k_{P_c}$ would be bigger than 1−α.

$$P(r_1^c < k_{P_c} < r_2^c) \geq 1-\alpha,$$

where α is predefined number, usually equal to one of the values 0.001, 0.005, 0.01, 0.05, 0.1, although other numbers may be suitable as well. In case of normal approximation, interval limits around quantile $k_{P_c}$ could be found using:

$$r_1^c = \lceil n*P_c + 0.5 - Z\alpha/2\sqrt{n*P_c*(1-P_c)} \rceil$$

$$r_2^c = \lceil n*P_c + 0.5 + Z\alpha/2\sqrt{n*P_c*(1-P_c)} \rceil$$

where $Z\alpha/2$ is the standard normal distribution's $$\frac{\alpha}{2}$$

quantile and satisfies $$\Phi(z_{\alpha/2}) = 1 - \frac{\alpha}{2}.$$

$\lceil * \rceil$ is a ceiling function and $\lfloor * \rfloor$ is a floor function. If $$k_{P_c} - \left\lfloor \frac{n}{2d} \right\rfloor > (k_{P_c} - r_1^c),$$

as determined at step 114, then use $$r_1^c = \left\lfloor \frac{n}{2d} \right\rfloor,$$

at step 116, else use $r_1^c$ value (step 118) calculated at step 112 (keep $r_1^c$ from calculation above). If $$k_{P_c} + \left\lfloor \frac{n}{2d} \right\rfloor < (k_{P_c} - r_2^c),$$

as determined at step 114, then use $$r_2^c = \left\lfloor \frac{n}{2d} \right\rfloor,$$

at step 116, else use $r_2^c$ value (step 118) calculated at step 112 (keep $r_2^c$ from calculation above).

5) Next, the system calculates a rounding factors set for each results' interval, at step 120. For every price interval $(r_1^c, r_2^c)$ the system finds rounding factor set $R^c$. For $$k = \lfloor \log_{10}(\text{results}(r_2^c) - \text{results}(r_1^c)) \rfloor,$$

the system creates rounding factor set $$R^c = \{10*10^{k-1}, 5*10^{k-1}, 2*10^{k-1}, 1*10^{k-1}\}$$

for K>0.
If k=0, use $R^c = \{10, 5, 2, 1\}$.
If k<0, use $R^c = \{10*10^k, 5*10^k, 2*10^k, 1*10^k\}$.

In case when results($r_2^c$)=results($r_1^c$), all results in interval ($r_1^c$,$r_2^c$) are equal, single value could be used to denote that interval.

6) The system searches for intervals' end points around quantiles. It starts a search close to the quantile $k_{P_c}$ and monotonically expands to the interval limits around quantile $k_{P_c}$. Two cases are possible, as determined at step 122: a) quantile $k_{P_c}$ is a positive integer, and b) quantile $k_{P_c}$ is not a positive integer (e.g., is a positive rational number).

Case 1 ($k_{P_c}$ is positive integer) (step 124):
For c=1 to d−1
  For j=0 to $r_1^c$ and i=0 to $r_2^c$
    In interval ($k_{P_c}$−j,$k_{P_c}$+i) the system searches for values, which rounding factor is one of elements from $R^c$. If one of the values has been found, the system saves it and continues searching for values, which rounding factors are rest of elements from $R^c$. The system stops looping if all values have been found.

Case 2 ($k_{P_c}$ is positive rational number) (step 126):
For c=1 to d−1
  Find $k_{P_c}^{lower}$=⌊$k_{P_c}$⌋ and $k_{P_c}^{upper}$=⌈$k_{P_c}$⌉.
  For j=0 to $r_1^c$ and i=0 to $r_2^c$
    In interval ($k_{P_c}^{lower}$−j,$k_{P_c}^{upper}$+1) searches for values, which rounding factor is one of elements from $R^c$. If one of the values has been found, the system saves it and continue search for values, which rounding factors are rest of elements from $R^c$. The system stops looping if all values have been found.

7) The system uses optimization criteria to choose optimal end points for each result interval, at step 128. Let's say $value_c^m$ result interval end points found in step 6 and $index_c^m$ such as $$\max_{\substack{all\ indexes \\ from\ interval}} results(index_c^m) < value_c^*$$

$$m = 1, \ldots, V, c = 1, \ldots, d-1.$$

For c=1 to d−1

Find $value_c^*$ minimize $$\min_m \left| \frac{index_c^m - index_{c-1}^m}{n} - \frac{k\ \%}{100\%} \right|$$

and $value_c^* < value(r_2^c + 1)$

Other optimization criteria could be described as follows: Find $value_c^*$ which rounding factor is the biggest and $index_c^*$ satisfy $$\left( \frac{index_c^m - index_{c-1}^m}{n} - \frac{k\ \%}{100\%} * 100\% \right) \in (k\ \% - r\ \%:k\ \% + r\ \%)$$

and $value_c^* < value(r_2^c + 1)$, where r=k %*θ and θ is some small user predefined number. If two values for one range satisfy optimization criteria, the system uses value with the biggest rounding factor.

8) Next, at step 120, the system creates price intervals or ranges for the results:

For c=1 to d
  If c=1, then interval endpoint is $value_1^*$ and results per interval are $Index_1^*$.
  If 1<c<d, then interval endpoint is $value_c^*$ and results per interval are $index_c^*$−$index_{c-1}^*$.
  If c=d, then results per interval are n−$index_{d-1}^*$.

If the prices in the interval around quantile are equal (results($r_1^c$)=results($r_2^c$)), skip that interval and continue with next quantile, using skipped quintile's upper confidential interval's limit as next quantile lower confidential interval's limit. If no endpoints have been found and (min(results)!=results($r_1^1$)) and/or (results($r_2^{d-1}$)!=max(results)), search those intervals (min(results)−results($r_1^1$)) and/or (results($r_2^{d-1}$)−max(results)), for end points.

Results are then displayed or presented to the user, such as on the user device, within the ranges or intervals.

Figure 2:
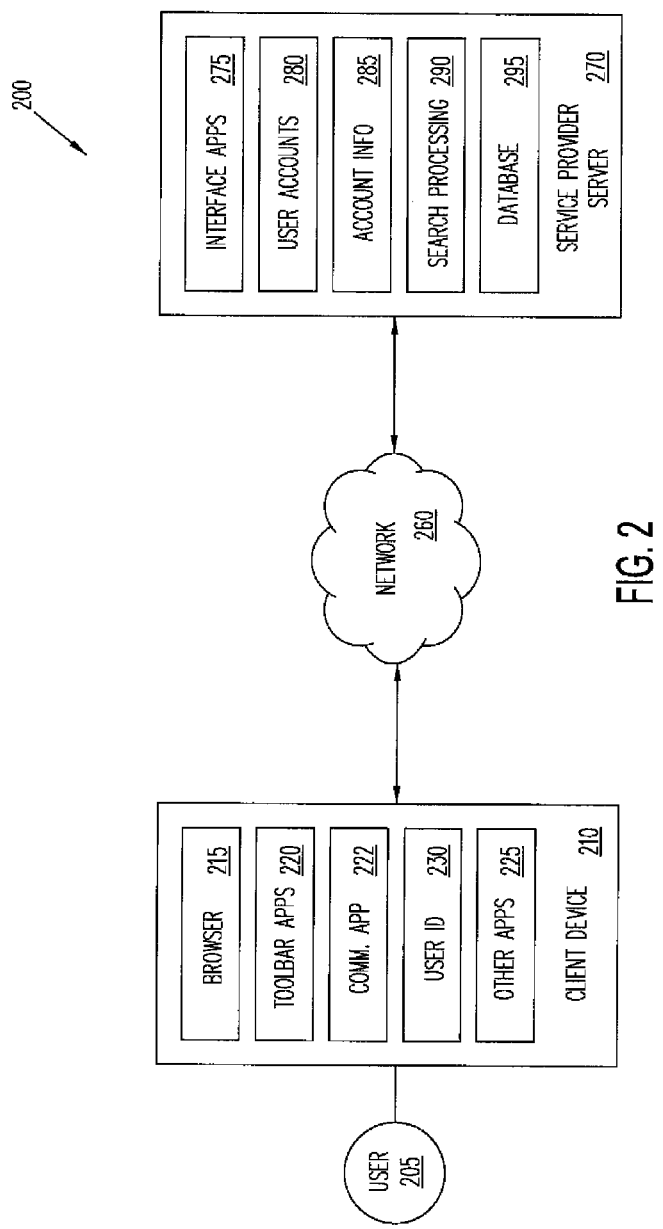
FIG. 2 is block diagram of a networked system suitable for implementing the process described herein according to an embodiment.

FIG. 2 is a block diagram of a networked system 200 configured to handle a process, such as described above, in accordance with an embodiment of the invention. System 200 includes a user device 210 and a service provider server 270 in communication over a network 260. Service provider server 270 may be maintained by a service provider, such as an online search engine or internet service provider. A user 205 utilizes user device 210 to perform transactions and processes using service provider server 270. Note that transactions, as used herein, refer to any suitable action performed using the user device, including online searching, transfer of information, display of information, etc.

User device 210 and service provider server 270 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

Network 260 may be implemented as a single network or a combination of multiple networks. For example, in various embodiments, network 260 may include the Internet or one or more intranets, landline networks, wireless networks, and/or other appropriate types of networks.

User device 210 may be implemented using any appropriate hardware and software configured for wired and/or wireless communication over network 260. For example, in one embodiment, the user device may be implemented as a personal computer (PC), a smart phone, personal digital assistant (PDA), computing tablet, and/or other types of computing devices capable of transmitting and/or receiving data.

User device 210 may include one or more browser applications 215 which may be used, for example, to provide a convenient interface to permit user 205 to browse information available over network 260. For example, in one embodiment, browser application 215 may be implemented as a web browser configured to view information available over the Internet, such as items listed or offered by a merchant or information provided by online sites. User device 210 may also include one or more toolbar applications 220 which may be used, for example, to provide client-side processing for performing desired tasks in response to operations selected by user 205. In one embodiment, toolbar application 220 may display a user interface in connection with browser application 215.

User device 210 may further include other applications 225 as may be desired in particular embodiments to provide desired features to user device 210. For example, other applications 225 may include security applications for implementing client-side security features, programmatic client applications for interfacing with appropriate application programming interfaces (APIs) over network 260, or other types of applications. Applications 225 may also include email, texting, voice and IM applications that allow user 205 to send and receive emails, calls, and texts through network 260, as well as applications that enable the user to communicate and transfer information through the service provider. User device 210 includes one or more user identifiers 230 which may be implemented, for example, as operating system registry entries, cookies associated with browser application 215, identifiers associated with hardware of user device 210, or other appropriate identifiers, such as used for user/device authentication. In one embodiment, user identifier 230 may be used by a service provider to associate user 205 with a particular account maintained by the service provider. A communications application 222, with associated interfaces, enables user device 210 to communicate within system 200.

Service provider server 270 may be maintained, for example, by an online service provider which may provide searching services for user 205. Service provider server 270 includes one or more interface applications 275 which may be configured to interact with user device 210 over network 260 to facilitate the transfer of information, such as search requests and search results, for user 205 of user device 210.

Service provider server 270 may also maintain a plurality of user accounts 280, each of which may include account information 285 associated with individual users. For example, account information 285 may include account numbers, passwords, device identifiers, user names, phone numbers, or other information which may be used to facilitate online transactions by user 205. Account information may also include user search history, as well as previously entered information by the user through the service provider services. Advantageously, interface application 275 may be configured to interact with user 205 during a transaction to display results of a search request by user 205 on user device 210.

A search processing application 290 may be configured to receive information from a user device for processing a search request as described herein. Results and other calculations may be stored in a database 295. Database 295 may also store merchant and other online service provider information. Search processing application 290 may also store details of a search request associated with individual users.

Figure 3:
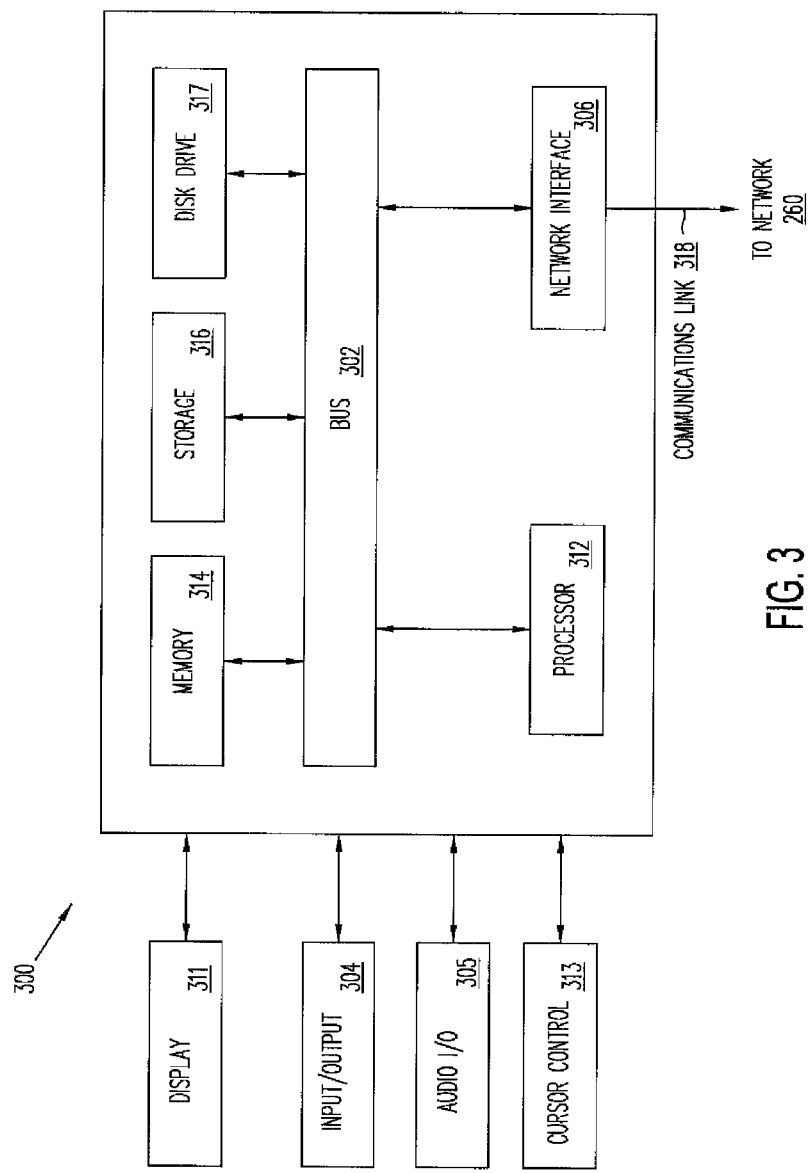
FIG. 3 is a block diagram of a computer system suitable for implementing one or more components in FIG. 2 according to one embodiment.

FIG. 3 is a block diagram of a computer system 300 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as one or more computer systems 300 in a manner as follows.

Computer system 300 includes a bus 302 or other communication mechanism for communicating information data, signals, and information between various components of computer system 300. Components include an input/output (I/O) component 304 that processes a user action, such as selecting keys from a keypad/keyboard, selecting one or more buttons or links, etc., and sends a corresponding signal to bus 302. I/O component 304 may also include an output component, such as a display 311 and a cursor control 313 (such as a keyboard, keypad, mouse, etc.). An optional audio input/output component 305 may also be included to allow a user to use voice for inputting information by converting audio signals. Audio I/O component 305 may allow the user to hear audio. A transceiver or network interface 306 transmits and receives signals between computer system 300 and other devices, such as another user device, a merchant server, or a payment provider server via network 360. In one embodiment, the transmission is wireless, although other transmission mediums and methods may also be suitable. A processor 312, which can be a micro-controller, digital signal processor (DSP), or other processing component, processes these various signals, such as for display on computer system 300 or transmission to other devices via a communication link 318. Processor 312 may also control transmission of information, such as cookies or IP addresses, to other devices.

Components of computer system 300 also include a system memory component 314 (e.g., RAM), a static storage component 316 (e.g., ROM), and/or a disk drive 317. Computer system 300 performs specific operations by processor 312 and other components by executing one or more sequences of instructions contained in system memory component 314. Logic may be encoded in a computer readable medium, which may refer to any medium that participates in providing instructions to processor 312 for execution. Such a medium may take many forms, including but not limited to, non-volatile media, volatile media, and transmission media. In various implementations, non-volatile media includes optical or magnetic disks, volatile media includes dynamic memory, such as system memory component 314, and transmission media includes coaxial cables, copper wire, and fiber optics, including wires that comprise bus 302. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A system comprising:
    a memory comprising instructions, wherein the memory is configured to store merchant information; and
    one or more processors configured to execute the instructions to cause the system to perform operations comprising:
        receiving a search query from a device;
        retrieving results from a search performed with the search query based at least on the merchant information, wherein the results indicate a plurality of items that corresponds to a plurality of prices such that each item from the plurality of items corresponds to a price from the plurality of prices;
        determining a plurality of variable ranges based at least on the plurality of prices, wherein the plurality of prices is distributable to the plurality of variable ranges such that there is an equal number of prices in each variable range of the plurality of variable ranges; and
    generating an indication of the determined plurality of variable ranges, wherein the indication is displayable on the device.

2. The system of claim 1, wherein the one or more processors further initiates a transmittal of the indication of the determined plurality of variable ranges to the device.

3. The system of claim 1, wherein each variable range of the determined plurality of variable ranges represents less than or equal to ten prices based at least on the equal number of prices in each variable range.

4. The system of claim 1, wherein the one or more processors is configured to execute the instructions to perform further operations comprising determining merchant ratings for the plurality of items, merchant sales for the plurality of items, categories for the plurality of items, overall reviews for the plurality of items, and consumer reviews for the plurality of items.

5. The system of claim 1, wherein the one or more processors is configured to execute the instructions to perform further operations comprising:
    receiving a selection from the device of that indicates a range selected from the plurality of variable ranges; and
    initiating a transmittal of prices from the range selected to the device.

6. The system of claim 5, wherein the one or more processors is configured to execute the instructions to perform further operations comprising:
    determining a second plurality of variable ranges from the selection received from the device; and
    distributing an equal number of prices in each variable range of the second plurality of variable ranges.

7. The system of claim 1, wherein the results are retrieved from a memory, database, or cloud, and wherein determining the plurality of variable ranges based on the plurality of prices comprises:
    determining a difference between a maximum price of the plurality of prices and a minimum price of the plurality of prices;
    determining an interval width based at least on a number of individual prices from the plurality of prices; and
    determining a number of individual ranges of the plurality of variable ranges based at least on the difference and the interval width.

8. A non-transitory machine-readable medium comprising a plurality of instructions which, when executed by one or more processors of a server, are adapted to cause the server to perform a method comprising:
    receiving a search query from a device;
    retrieving results from a search performed based at least on the search query, wherein the results indicate a plurality of items that correspond to a plurality of prices such that each item from the plurality of items corresponds to a price from the plurality of prices;
    determining a plurality of variable ranges based at least on a manageable number of prices set for each variable range of the plurality of variable ranges, wherein the manageable number of prices is approximately 8 to 10 prices; and
    generating an indication of the determined plurality of variable ranges, wherein the indication is displayable on the device.

9. The non-transitory machine-readable medium of claim 8, wherein the method further comprises initiating a transmittal of the indication of the determined plurality of variable ranges to the device.

10. The non-transitory machine-readable medium of claim 8, wherein the manageable number of prices further comprises approximately 10 to 20 prices.

11. The non-transitory machine-readable medium of claim 8, wherein the method further comprises determining merchant ratings for the plurality of items, merchant sales for the plurality of items, categories for the plurality of items, overall reviews for the plurality of items, and consumer reviews for the plurality of items.

12. The non-transitory machine-readable medium of claim 8, wherein the method further comprises:
    receiving a selection from the device that indicates a range selected from the plurality of variable ranges; and
    initiating a transmittal of prices from the range selected to the device.

13. The non-transitory machine-readable medium of claim 12, wherein the method further comprises:
    determining a second plurality of variable ranges for from the selection received from the device; and
    distributing an equal number of prices in each variable range of the second plurality of variable ranges.

14. The non-transitory machine-readable medium of claim 8, wherein the results are retrieved from a memory, database, or cloud, and wherein determining the plurality of variable ranges based on the plurality of prices comprises:

determining a difference between a maximum price of the plurality of prices and a minimum price of the plurality of prices;

determining an interval width based at least on a number of individual prices from the plurality of prices; and determining a number of individual ranges of the plurality of variable ranges based at least on the difference and the interval width.

15. A method comprising:

receiving, electronically by a processor of a service provider, a search query from a device;

retrieving, electronically by the processor, results from a search performed based at least on the search query, wherein the results indicate a plurality of items that correspond to a plurality of prices such that each item from the plurality of items corresponds to a price from the plurality of prices;

determining, electronically by the processor, a plurality of variable ranges based at least on a manageable number of prices set for each variable range of the plurality of variable ranges, wherein the manageable number of prices is approximately 8 to 10 prices; and generating an indication of the determined plurality of variable ranges, wherein the indication is displayable on the device.

16. The method of claim 15, further comprising initiating a transmittal of the indication of the determined plurality of variable ranges to the device.

17. The method of claim 15, wherein the manageable number of prices further comprises approximately 10 to 30 prices.

18. The method of claim 15, further comprising determining merchant ratings for the plurality of items, merchant sales for the plurality of items, categories for the plurality of items, overall reviews for the plurality of items, and consumer reviews for the plurality of items.

19. The method of claim 15, further comprising:

receiving a selection from the device that indicates a range selected from the plurality of variable ranges; and initiating a transmittal of prices from the range selected to the user device.

20. The method of claim 19, further comprising:

determining a second plurality of variable ranges from the selection received from the device; and distributing an equal number of results in each of the second plurality of variable ranges.

21. The method of claim 15, the results are retrieved from a memory, database, or cloud, and wherein determining the plurality of variable ranges based on the plurality of prices comprises:

determining a difference between a maximum price of the plurality of prices and a minimum price of the plurality of prices;

determining an interval width based at least on a number of individual prices from the plurality of prices; and determining a number of individual ranges of the plurality of variable ranges based at least on the difference and the interval width.

* * * * *